United States Patent [19]

Federico et al.

[11] Patent Number: 5,103,385
[45] Date of Patent: Apr. 7, 1992

[54] LINEAR LIGHT SOURCE

[75] Inventors: Richard J. Federico, Churchville; Gary L. Erck, Webster, both of N.Y.

[73] Assignee: Eastman Kodak Company, Rochester, N.Y.

[21] Appl. No.: 559,741

[22] Filed: Jul. 27, 1990

[51] Int. Cl.⁵ ............................................. F21V 7/00
[52] U.S. Cl. .................................. 362/298; 362/301; 362/302; 358/491
[58] Field of Search ............... 362/298, 301, 302; 358/54, 214, 216, 491, 475, 484; 355/67, 228

[56] References Cited

U.S. PATENT DOCUMENTS

| | | | |
|---|---|---|---|
| 3,212,417 | 10/1965 | Gundlach | 95/1.7 |
| 3,241,440 | 3/1966 | Kugler | 88/24 |
| 3,455,622 | 7/1969 | Cooper | 362/293 |
| 3,553,463 | 1/1971 | Dhir et al. | 358/491 |
| 4,205,337 | 5/1980 | Millward | 358/54 |
| 4,226,522 | 10/1980 | Marshall | 355/1 |
| 4,321,630 | 3/1982 | Kramer | 358/294 |
| 4,396,834 | 8/1983 | Appel et al. | 250/216 |
| 4,422,100 | 12/1983 | DuVall et al. | 358/293 |
| 4,460,939 | 7/1984 | Murakami et al. | 362/294 |
| 4,568,984 | 2/1986 | Juergensen et al. | 358/293 |
| 4,690,564 | 9/1987 | Morgenstern et al. | 356/445 |
| 4,797,711 | 1/1989 | Sasada et al. | 355/32 |
| 4,833,779 | 5/1989 | Milch | 358/491 |
| 4,868,383 | 9/1989 | Kurtz et al. | 250/228 |

Primary Examiner—Ira S. Lazarus
Assistant Examiner—Richard R. Cole
Attorney, Agent, or Firm—Donald D. Schaper

[57] ABSTRACT

A linear light source for a film scanner is disclosed which includes an elongated light integrating cavity having diffusely reflective walls. Light is introduced into the cavity through an input port, and an output beam of diffuse illumination is produced through a slot which is generally parallel to the longitudinal axis of the integrating cavity. A baffle is disposed in the cavity along the longitudinal axis to prevent light from passing directly from the input port to the output slot. In order to provide a light source which can be positioned closely adjacent the film in a film scanner, the surfaces of the integrating cavity walls adjacent the output slot are generally linear and are disposed at an angle to the optical axis of the output beam.

11 Claims, 3 Drawing Sheets

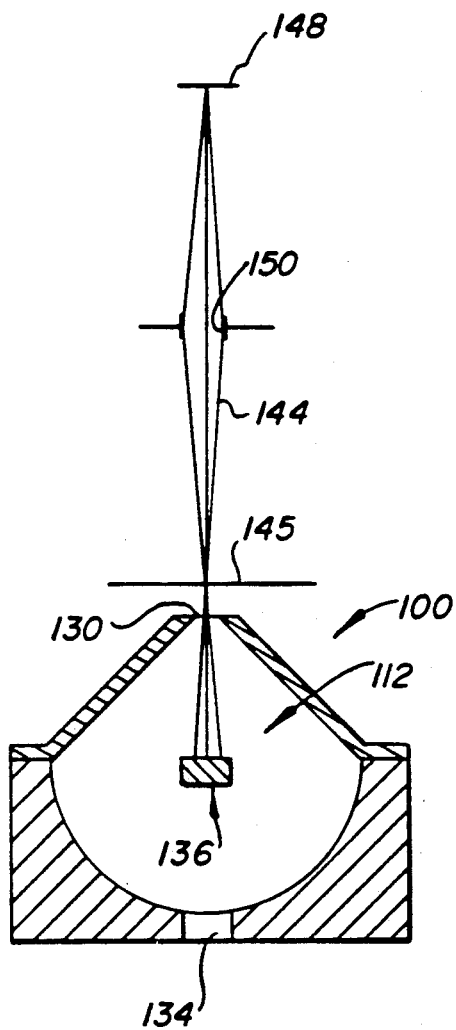
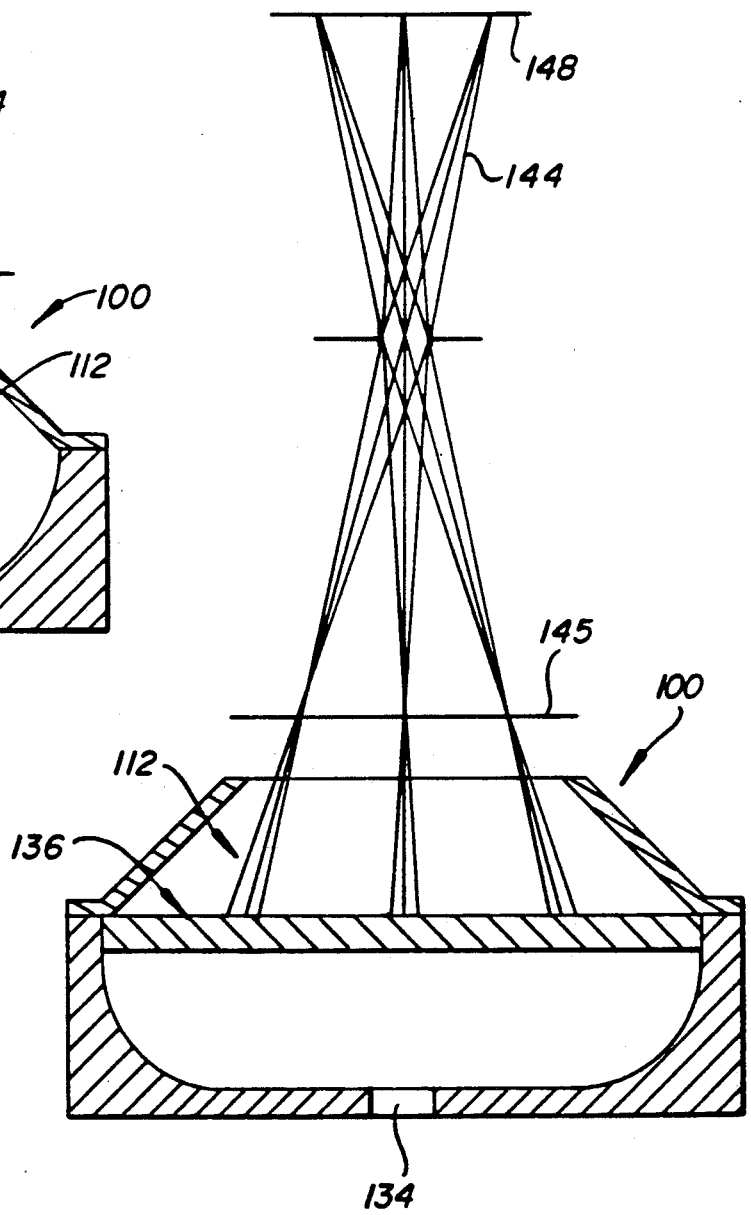

LINEAR LIGHT SOURCE

REFERENCE TO RELATED APPLICATION

Reference is made to U.S. application Ser. No. 559,481, entitled "Film Scanner", filed in the name of Fetterman et al. on even date herewith.

FIELD OF THE INVENTION

The present invention relates to a linear light source, and more particularly, to such a light source for use in a film scanner.

DESCRIPTION OF THE PRIOR ART

A film scanner typically includes a linear CCD image sensor which provides a serial output of signals representing successive lines of an image. For color applications, the film scanner can include an assembly of three separate CCD image sensors, one for each of the primary colors. The film is driven at a uniform rate past a light beam provided by an illumination system, and an illuminated section of the film is imaged onto each CCD image sensor. The film motion provides the frame scan, and the linear cycling of the elements in the image sensor provides the line scan. A scanner of this type is disclosed in U.S. Pat. No. 4,205,337..

It is common for film scanners to have an illumination system which produces a line of light across the film. The lamps used in such systems normally produce a circularly symmetric light beam, and there is a problem in these systems in providing for an efficient conversion of the circular beam to a uniform line distribution of the light. In U.S. Pat. No. 4,797,711, for example, there is disclosed a scanner in which a transparent cylindrical rod is arranged to produce a line of light on an original. Light from a light source passes through color filters and is then directed onto one end of the cylindrical rod. Light reflected from the original is imaged onto a CCD image sensor. One of the main problems of the illumination system shown in this patent is that it does not provide a uniform line of diffuse light to an original such as film, and thus, artifacts on the original, e.g. scratches, will appear in an image produced from the scanned information.

An improved type of illumination system is disclosed in U.S. Pat. No. 4,868,383, which is assigned to the assignee of the present invention. This patent discloses a linear light source for a film scanner which includes means for generating an intense beam of light and an elongated cylindrical integrating cavity having diffusely reflective walls. The intense beam is introduced into the cavity through an input port, and a uniform line of light is emitted through an output slit which extends parallel to the longitudinal axis of the cylindrical integrating cavity. Such a light source produces a line of diffuse light which has a uniform linear and angular distribution, and excellent results can be obtained over a wide range of operation conditions. There is a need, however, in certain types of scanners for a linear light source which is constructed such that it can be positioned closely adjacent the film in order to provide an optimal distribution of light and a high degree of scratch suppression.

SUMMARY OF THE INVENTION

It is an object of the present invention to overcome the problems in the prior art discussed above and to provide an improved linear light source for a film scanner.

In accordance with one aspect of the present invention, there is provided a linear light source comprising: a source for producing a beam of radiation; and an elongated light integrating cavity defined by walls having diffusely reflecting interior surfaces, the walls having an input port through which the beam is introduced into the cavity and a output slot generally parallel to a longitudinal axis of the cavity, the beam being introduced into the cavity such that the beam undergoes at least one diffuse reflection before exiting the output slot along an optical axis, and the interior surfaces of the walls adjacent the output slot being generally linear and forming an angle with the optical axis.

In one embodiment of the present invention, the light source includes an elongated light integrating cavity having diffusely reflective walls. Light is introduced into the cavity through an input port, and a line of diffuse illumination exits the cavity through an output slot which is parallel to a longitudinal axis of the integrating cavity. A baffle is arranged in the cavity opposite the input port to prevent light from passing directly from the input port to the output slot and to block any non-uniform portions of the cavity from the field of view of the imaging lens. The cavity includes a generally cylindrical surface portion and generally linear portions adjacent the output slot which are disposed at an angle of about 45° to the optical axis of the exit beam.

A principal advantage of the disclosed linear light source is that it is particularly effective in suppressing the effects of film surface damage, such as a scratch, on a reproduced image. The light source includes an integrating cavity in which the walls adjacent the output slot are constructed such that the light source can be closely positioned adjacent the film in a scanner, thereby providing an optimal distribution of light on the film and achieving a high degree of scratch suppression. A baffle, which extends the length of the integrating cavity and is aligned with the output port, is used to produce uniformity in the output beam along the entire length of the output slot. Thus, the linear light source of the present invention produces an intense line of light having a highly uniform intensity along its length and a substantially uniform angular distribution.

Other features and advantages will become apparent upon reference to the following description of the preferred embodiment when read in light of the attached drawings.

BRIEF DESCRIPTION OF THE DRAWINGS

FIGS. 8 and 9, are views similar to FIGS. 6 and 7, respectively, showing the light which enters the lens aperture in the absence of any scratches on the film.

DESCRIPTION OF THE PREFERRED EMBODIMENT

Figure 1:
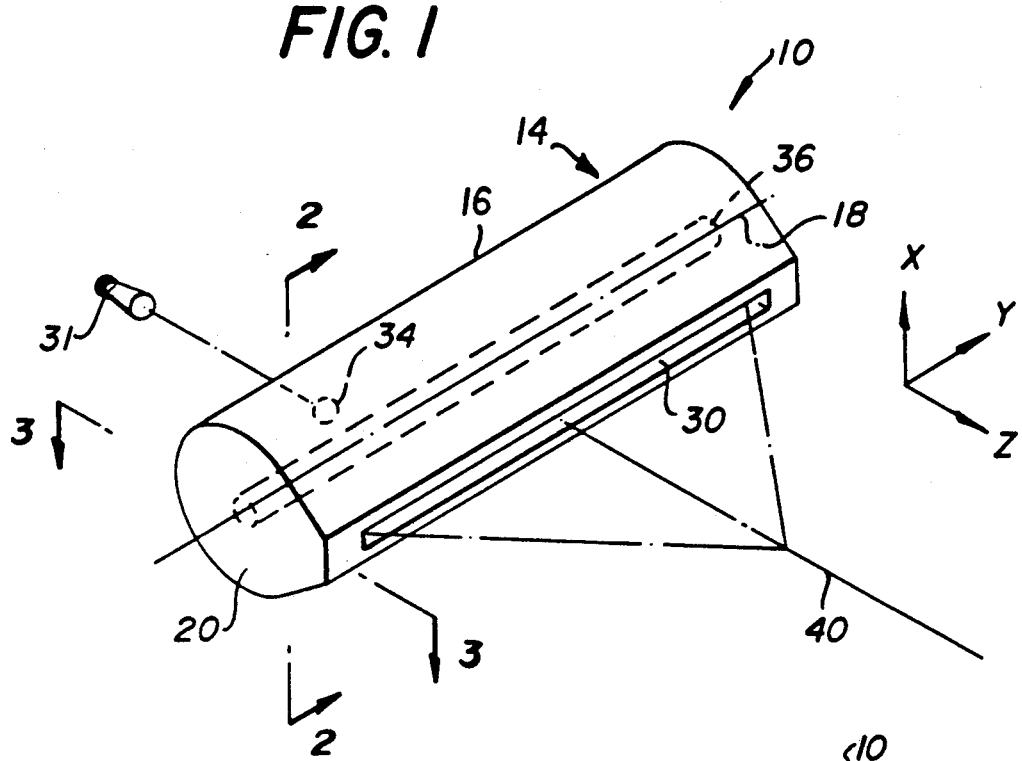
FIG. 1 is a perspective view of the linear light source of the present invention.
Figure 2:
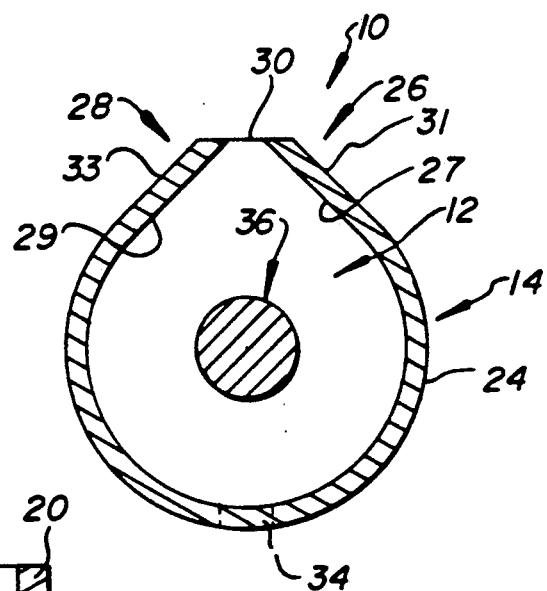
FIG. 2 is a sectional view, taken along the line 2—2 in FIG. 1.
Figure 3:
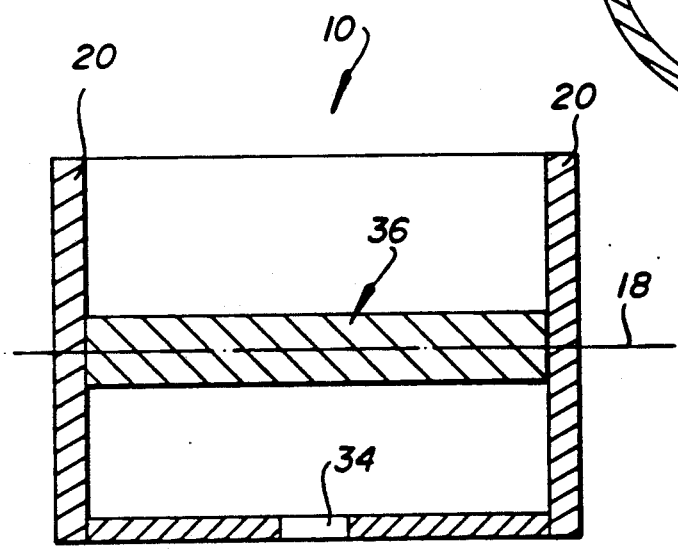
FIG. 3 is a sectional view, taken along the line 3—3 in FIG. 1.

With reference to FIGS. 1-3, there is shown a linear light source 10 constructed in accordance with the present invention. Light source 10 includes an elongated integrating cavity 12 which is formed within a body 14. Body 14 includes a longitudinal section 16 formed about a longitudinal axis 18 and end pieces 20 disposed at opposite ends of section 16. The cavity 12 in longitudinal section 16 is formed by a generally cylindrical wall portion 24 and two generally linear wall portions 26 and 28 which extend to form an exit slot 30. Light from a source 31 is provided to cavity 12 through an input port 34, and a line of light is emitted from cavity 12 through an exit slot 30. A baffle 36 is located along the longitudinal axis 18 to prevent light from passing directly from the input port 34 to the exit slot 30.

The body 14 of linear light source 10 is preferably made from aluminum, and the light-contacting surfaces are painted with Spectraflect TM paint which is a highly reflective diffuse white paint; this paint is obtainable from Labsphere Corporation, North Sutton, New Hampshire. Body 14 can also be machined from a block of diffusely reflecting polytetrafluoroethylene plastic, known as Spectralon TM, also available from the Labsphere Corporation. In one exemplary device, the cavity 12 is 27 millimeters long and the cylindrical wall portion 24 is 35.54 millimeters in diameter. The input port 34 is a round hole 12.5 millimeters in diameter, and the exit slot 30 is 2½ millimeters wide by 27 millimeters long.

The baffle 36 keeps any input light from exiting the cavity 12 without reflecting off of at least one internal cavity surface. Baffle 36 can be, for example, cylindrical, rectangular, or triangular, in cross section. All internal surfaces of cavity 12, including surfaces of baffle 36, are highly reflective diffuse surfaces. The position and size of the baffle 36 permits the position of the input light to the cavity 12 to be non-critical, as long as the input is centered relative to the output slot 30. Thus, light input to cavity 12 can be perpendicular to or colinear with an optical axis 40 of the imaging lens (not shown).

Light source 10 is adapted to function with lamp 31 as the source of radiation, and lamp 31 can be, for example, a xenon lamp. One suitable xenon lamp is a Model No. LX-300f, manufactured by ILC Cermax Lamps. Other lamps can be used, e.g., a 24 volt DC tungsten-halogen lamp, type ELC, manufactured by General Electric Corporation. Light from lamp 31 can be directed into input port 34 of cavity 12 by various means (not shown) such as a mirror, a lens, a fiber optic bundle, or a light pipe. The use of a light pipe or fiber optic bundle allows the radiation source and any focusing optics to be displaced from the cavity 12. These elements also provide mixing of input light. A suitable light pipe for introducing light into cavity 12 is a rod which is formed from fused quartz or a fused silica material and has a very high transmission, for example, a fused quartz rod obtainable from Heraeus-Amersil, Inc.

Temporal control of the illumination intensity of the radiation source (not shown) can be achieved by sampling the diffuse light from the integrating cavity 12. Such a system is disclosed in the aforementioned U.S. Pat. No. 4,868,383, and the disclosure of this patent is expressly incorporated herein by reference. As disclosed in this patent, a feedback port can be provided in the integrating cavity 12 to remove a sample of the diffuse light. The light exiting the feedback port is directed by means of an optical fiber to a photosensor such as a silicon photodiode. The output from the photodiode is provided through a feedback circuit to a power supply for the radiation source.

An important feature of the linear light source 10 is the use of linear walls 26 and 28 to achieve a construction which makes it possible to closely position the light source adjacent the film in a scanner, thereby achieving an optimal distribution of light and a high degree of scratch suppression. Walls 26 and 28 have interior surfaces 27 and 29 which are disposed at an angle $\alpha$ (FIG. 4) of about 45° to optical axis 40. As shown in FIG. 2, exterior surfaces 31 and 33 of walls 26 and 28 are generally parallel to surfaces 27 and 29, respectively, and thus, the walls 26 and 28 give the light source 10 a generally wedge shape adjacent slot 30. As a result of this wedge shape, interference with other elements of a film gate (not shown) is minimized. A further advantage of this shape is that it allows minimum air space between the output slot 30 and the film. Diffuse illumination of the film at angles extending out to approximately ±45° will provide good scratch suppression; this dictates that the output slot width in light source 10 be approximately two times the distance from slot 30 to film 45. By reducing the distance from slot 30 to film, the size of the slot 30 can be minimized which produces higher radiance and better uniformity. Linear light source 10 is particularly suitable for use in a rotary scanner having a dynamic film gate, as disclosed, for example, in the aforementioned U.S. patent application entitled "Film Scanner."

Figure 4:
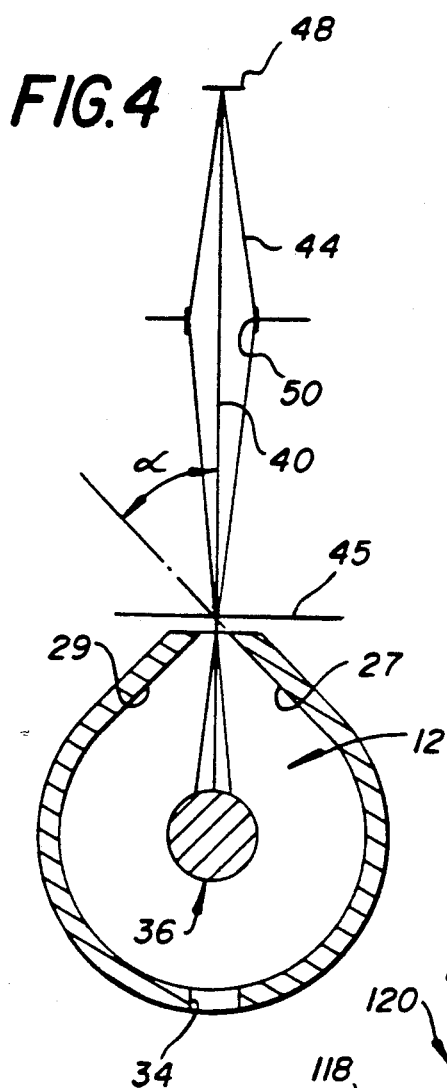
FIGS. 4 and 5 are views similar to FIGS. 2 and 3, respectively, showing the light which enters the lens aperture in the absence of any scratches on the film.
Figure 5:
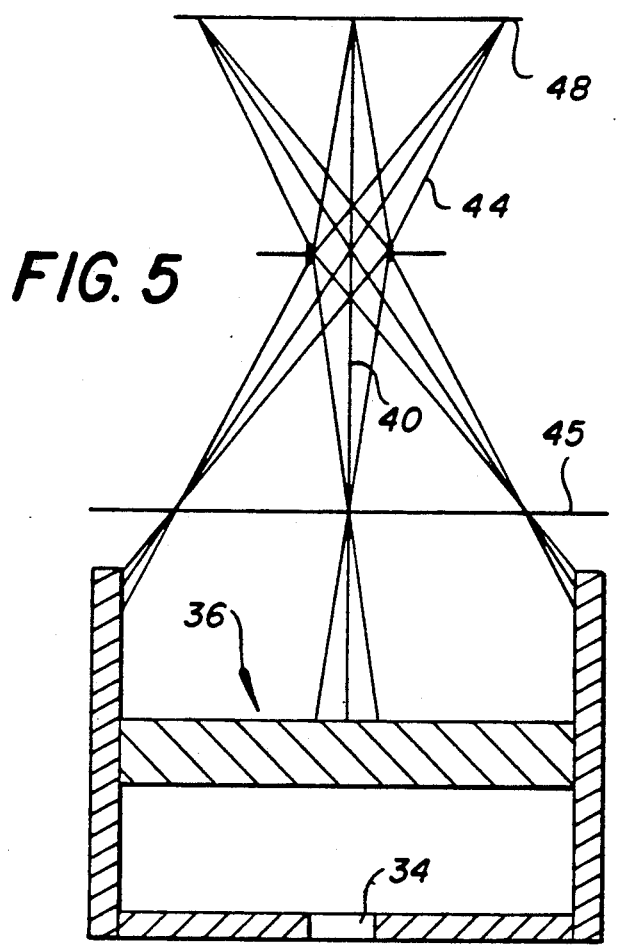
Figure 6:
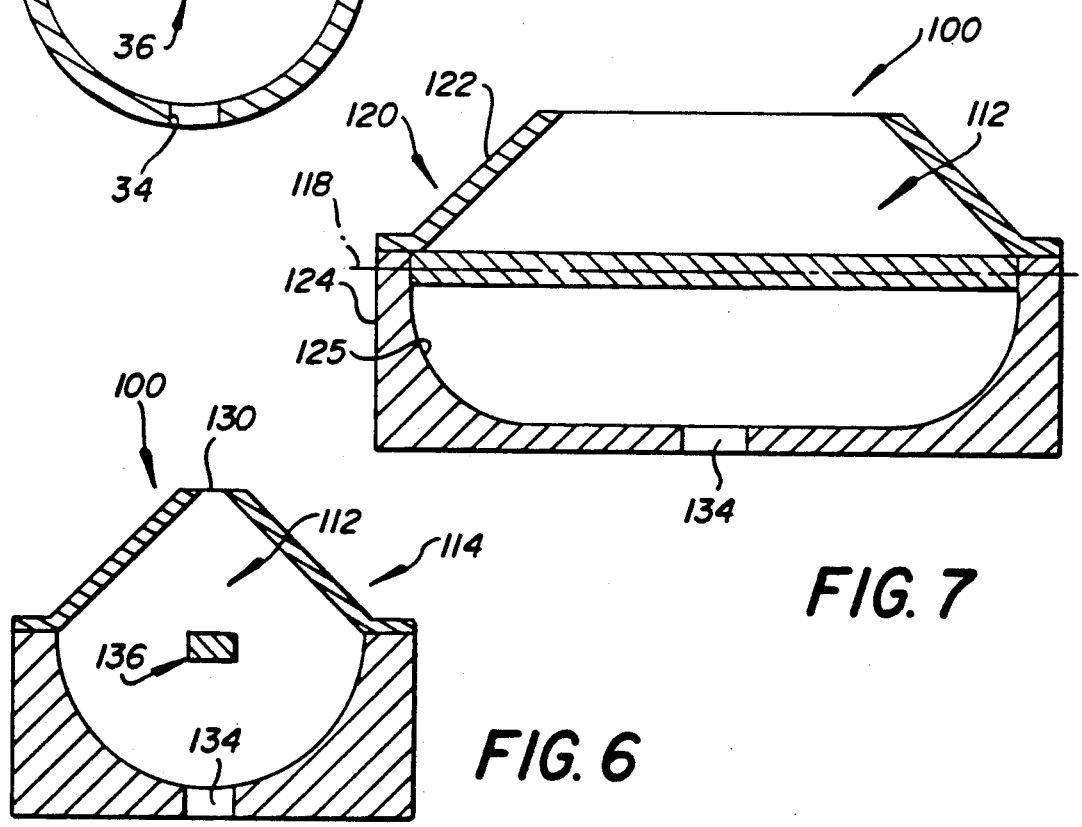
FIGS. 6 and 7 are sectional views, similar to FIGS. 2 and 3, in which a second embodiment of the present invention is shown.

With reference to FIGS. 4 and 5, the light entering aperture 50 from slot 30 is shown for two orthogonal planes. As indicated in FIG. 1, the plane in the line of illumination is designated the Y-Z plane, and the plane perpendicular thereto is designated the X-Z plane. Beam 44 is projected through a film 45 and is imaged on an image sensor (not shown) which would be located at an image plane 48. In the X-Z plane, shown in FIG. 4, the beam 44 would pass through an aperture 50 of an imaging lens (not shown) and would be focussed to a point at image plane 48. In the Y-Z plane, shown in FIG. 5, beam 44 would impinge on film 45 in the form of a line of light, be transmitted through the film 45, and then be imaged along the length of an image sensor (not shown) at plane 48.

A second embodiment of the present invention is shown in FIGS. 6-9. As shown in these figures, a linear light source 100 comprises a integrating cavity 112 which is formed by a body 114 and end pieces 120 disposed at opposite ends of body 114. A generally rectangular baffle 136 is located along a longitudinal axis 118 of the light source 100. Light is directed into cavity 112 through an input port 134, and the light exits from cavity 112 through an exit slot 130. A beam of light 144 from slot 130 is directed through, for example, a film 145. Light transmitted through the film 145 passes through aperture 150 of an imaging lens (not shown) and is focussed at image plane 148.

Figure 7:
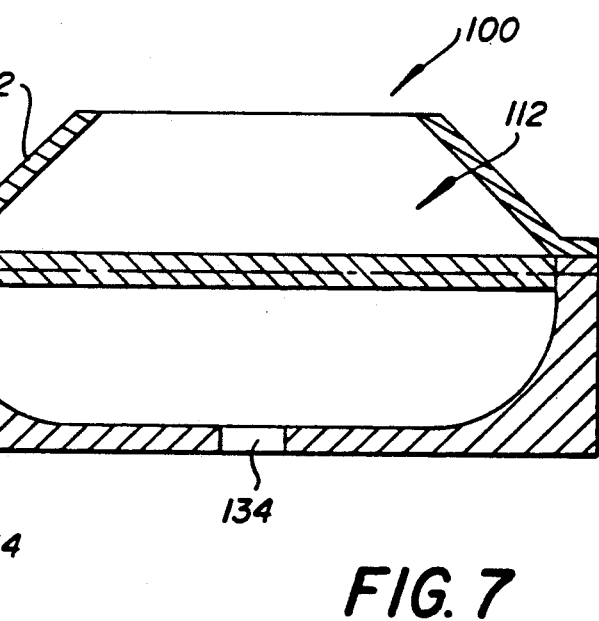

Light source 100 is generally similar to light source 10 with the exception of end pieces 120. As shown in FIGS. 7 and 9, each of the end pieces 120 includes a generally linear portion 122 and an adjoining portion 124 which includes a spherical surface 125 in cavity 112.

Light source 100 produces a very uniform distribution of light along the length of the slot 130.

The invention has been described in detail with particular reference to the preferred embodiment thereof, but it will be understood that variations and modifications can be effected within the spirit and scope of the invention.

What is claimed is:

1. A linear light source comprising:
   a source for producing a beam of radiation; and
   an elongated light integrating cavity defined by walls having a diffusely-reflecting interior surfaces, said walls having an input port through which said beam is introduced into said cavity and an output slot generally parallel to a longitudinal axis of said cavity, the beam being introduced into said cavity such that the beam undergoes at least one diffuse reflection before exiting the output slot, the interior surfaces of said walls adjacent said output slot being generally linear and forming an angle with an optical axis which is generally perpendicular to said longitudinal axis; and
   a baffle in said cavity located between said input port and said output slot, said baffle extending the length of said cavity and having generally planar sides.

2. A linear light source comprising:
   a source for producing a beam of radiation; and
   an elongated light integrating cavity defined by walls having a diffusely-reflecting interior surfaces and by end pieces having interior surfaces which form an angle of less than 90° with a longitudinal axis of said cavity, said walls having an input port through which said beam is introduced into said cavity and an output slot generally parallel to said longitudinal axis, the beam being introduced into said cavity such that the beam undergoes at least one diffuse reflection before exiting the output slot, and the interior surfaces of said walls adjacent said output slot being generally linear and forming an angle with an optical axis which is generally perpendicular to said longitudinal axis.

3. A linear light source, as defined in claim 2, wherein the interior surfaces of said end pieces include generally spherical portions.

4. A linear light source comprising:
   a source for producing a beam of radiation; and
   an elongated light integrating cavity defined by walls having a diffusely-reflecting interior surfaces, said walls having an input port through which said beam is introduced into said cavity and an output slot generally parallel to a longitudinal axis of said cavity, the beam being introduced into said cavity such that the beam undergoes at least one diffuse reflection before exiting the output slot, the interior surfaces of said walls adjacent said output slot being generally linear and forming an angle with an optical axis which is generally perpendicular to said longitudinal axis, the interior surfaces of said walls adjacent said output slot being joined by a generally cylindrical surface, and said interior surfaces of said walls adjacent said output slot being tangent to said cylindrical surface.

5. A linear light source, as defined in claim 4, wherein a baffle in said cavity is located between said input port and said output slot.

6. A linear light source, as defined in claim 5, wherein said baffle extends the length of said cavity.

7. A linear light source, as defined in claim 6, wherein said baffle is generally circular in cross section.

8. A linear light source, as defined in claim 4, wherein said walls have exterior surfaces adjacent said output slot which are at generally the same angle to said optical axis as said interior surfaces of the walls adjacent said output slot.

9. A linear light source, as defined in claim 4, wherein an input port is located in said cylindrical surface.

10. A linear light source, as defined in claim 4, wherein said cavity is further defined by end pieces which are generally perpendicular to said longitudinal axis.

11. A linear light source, as defined in claim 4, wherein said beam is introduced into said cavity through a light pipe in the form of a quartz rod.

* * * * *